US010967429B2

(12) United States Patent
Barr (10) Patent No.: US 10,967,429 B2
(45) Date of Patent: Apr. 6, 2021

(54) LIFTING AND REMOVAL DEVICE FOR ADDITIVE MANUFACTURING SYSTEM

(71) Applicant: Honeywell Federal Manufacturing & Technologies, LLC, Kansas City, MO (US)

(72) Inventor: Christian G. Barr, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 22 days.

(21) Appl. No.: 16/673,240

(22) Filed: Nov. 4, 2019

(65) Prior Publication Data

US 2020/0101533 A1    Apr. 2, 2020

Related U.S. Application Data

(62) Division of application No. 15/151,266, filed on May 10, 2016, now Pat. No. 10,493,525.

(51) Int. Cl.
| | |
|---|---|
| *B22F 3/00* | (2021.01) |
| *B22F 3/10* | (2006.01) |
| *B33Y 40/00* | (2020.01) |
| *B29C 64/379* | (2017.01) |
| *B22F 10/00* | (2021.01) |

(52) U.S. Cl.
CPC .......... *B22F 3/005* (2013.01); *B29C 64/379* (2017.08); *B33Y 40/00* (2014.12); *B22F 10/00* (2021.01); *Y02P 10/25* (2015.11)

(58) Field of Classification Search
CPC ........ B22F 3/005; B22F 3/008; B22F 3/1055; B33Y 40/00; B29C 64/379; Y02P 10/25
See application file for complete search history.

(56) References Cited

U.S. PATENT DOCUMENTS

| | | | | |
|---|---|---|---|---|
| 2018/0229402 | A1* | 8/2018 | Gunner | B29C 33/3842 |
| 2018/0361679 | A1* | 12/2018 | Joyce | B33Y 50/02 |
| 2020/0094478 | A1* | 3/2020 | Zediker | B23K 26/703 |
| 2020/0108465 | A1* | 4/2020 | Sweetland | B22F 3/1055 |
| 2020/0376764 | A1* | 12/2020 | Zediker | B23K 26/123 |

\* cited by examiner

*Primary Examiner* — Saul Rodriguez
*Assistant Examiner* — Ashley K Romano
(74) *Attorney, Agent, or Firm* — Hovey Williams LLP (57) ABSTRACT

An attachment device for lifting and removing build plates and additive manufactured parts built on the build plates from an additive manufacturing machine. The attachment device may fit onto a lift trolley to cooperatively engage with and lift the build plate upward off of a surface of the additive manufacturing machine. The attachment device may include a support bar, two lifting arms, and a mounting bracket. The support bar may have a slider track formed therethrough, so that the lifting arms can be adjusted to correspond with a width of the build plate. The lifting arms may each having a channel formed along a length thereof and an interfacing portion slidably located within the slider track. The channels may be sized and shaped to engage with a bottom surface and/or opposing edges of the build plates. The mounting bracket may attach to a lifting device of the lift trolley.

20 Claims, 6 Drawing Sheets

LIFTING AND REMOVAL DEVICE FOR ADDITIVE MANUFACTURING SYSTEM

RELATED APPLICATIONS

This patent application is a divisional application, and claims priority benefit with regard to all common subject matter, of earlier-filed U.S. patent application Ser. No. 15/151,266, filed on May 10, 2016, and entitled "LIFTING AND REMOVAL DEVICE FOR ADDITIVE MANUFACTURING SYSTEM". The identified earlier-filed patent application is hereby incorporated by reference in its entirety into the present application.

STATEMENT REGARDING FEDERALLY-SPONSORED RESEARCH OR DEVELOPMENT

This invention was made with Government support under Contract No.: DE-NA0000622 awarded by the United States Department of Energy/National Nuclear Security Administration. The Government has certain rights in the invention.

BACKGROUND

Additive manufacturing is a method of creating parts that uses directed energy to melt or sinter powder that is deposited on a platform and exposed uniformly to a vacuum or a cover gas. A first layer of powder is uniformly deposited on the build platform, and then the directed energy melts the powder to create a first layer of the part. Then another layer of powder is uniformly deposited onto the first layer, and the directed energy fuses this layer to the first layer. This process is repeated until a three-dimensional part is complete.

Completed parts must typically be manually lifted from an additive manufacturing build chamber. Specifically, an operator must lift the part and the build plate from the build chamber and place the part onto another transport device or carry it to a next desired location. Lifting of large parts, some of which may weigh in excess of 300 pounds, may generally increase risk of injury and increase the odds of a part being dropped or otherwise damaged during manual transport.

Thus, there is a need for an apparatus or method for removing large additive manufactured parts from the build chamber without risking injury or part damage.

SUMMARY

Embodiments of the present invention solve the above-mentioned problems and provide a distinct advance in the art of removing additive manufactured parts from an additive manufacturing system.

One embodiment of the invention is an attachment device for lifting and removing build plates and additive manufactured parts built on the build plates out of an additive manufacturing machine. The attachment device may include a support bar, two lifting arms, and a mounting bracket. The support bar may have a slider track formed into or through the support bar. The lifting arms may each have a channel formed along a length thereof and an interfacing portion slidably located within the slider track. The mounting bracket may attach to a lifting device of a lift trolley. The lift trolley may include a frame horizontally actuatable toward and away from the additive manufacturing machine. The lifting device of the lift trolley may be vertically actuatable up and down the frame of the lift trolley.

In another embodiment of the invention, an attachment device for lifting and removing build plates and additive manufactured parts built on the build plates out of an additive manufacturing machine may include a support bar, a right lifting arm, a left lifting arm, a mounting bracket, and a lift trolley. Specifically, the support bar may have an elongated slider track formed into or through the support bar, and the slider track may include indentions spaced apart along a bottom portion of the slider track. The right lifting arm may have a first end and a second end, with a right interfacing portion at the first end of the right lifting arm slidably retained within the slider track. The right lifting arm may also have a right channel formed therein, having two right channel walls meeting at 90-degrees. The right interfacing portion may include at least one right protrusion extending downward and shaped to be selectively seated into any one of the plurality of indentions. Likewise, the left lifting arm may have a first end and a second end, with a left interfacing portion at the first end of the left lifting arm slidably retained within the slider track. The left lifting arm may have a left channel formed therein, having two left channel walls meeting at 90-degrees. The left interfacing portion may include at least one left protrusion extending downward and shaped to be selectively seated into any one of the plurality of indentions. The mounting bracket may be fixed to or integrally formed with the support bar. The lift trolley may include a frame, a lifting device actuatable to travel vertically up and down the frame, and wheels attached to the frame for manually or automatically rolling the frame on a surface or floor. The mounting bracket may be removably attached to the lifting device.

Yet another embodiment of the invention may include a method of removing a build plate and an additive manufactured part built on the build plate out of an additive manufacturing machine using an attachment device. The attachment device may include a support bar with a slider track formed into or through the support bar, two lifting arms each having a channel formed along a length thereof and an interfacing portion slidably located within the slider track such that the lifting arms extend substantially forward from and perpendicular relative to the support bar, and a mounting bracket fixed on a back side of the support bar. The method may include a step of attaching the mounting bracket to a lifting device of a lift trolley. The mounting bracket may be an L-bracket or U-bracket sized and shaped to slide onto at least a portion of the lifting device. The method may then include the steps of rolling or sliding a frame of the lift trolley in a direction toward the build plate until the two lifting arms are reaching into the additive manufacturing machine below the build plate, and sliding the two lifting arms toward or away from each other until edges of the build plate are vertically aligned with at least a portion of the channels of each of the lifting arms. The method may also include a step of raising the lifting device vertically, thereby engaging with and raising the build plate and the additive manufactured part upward and off of a surface of the additive manufacturing machine. Then, the method may include a step of rolling or sliding the frame of the lift trolley in a direction away from the additive manufacturing machine, thus carrying the build plate and the additive manufactured part out of the additive manufacturing machine.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
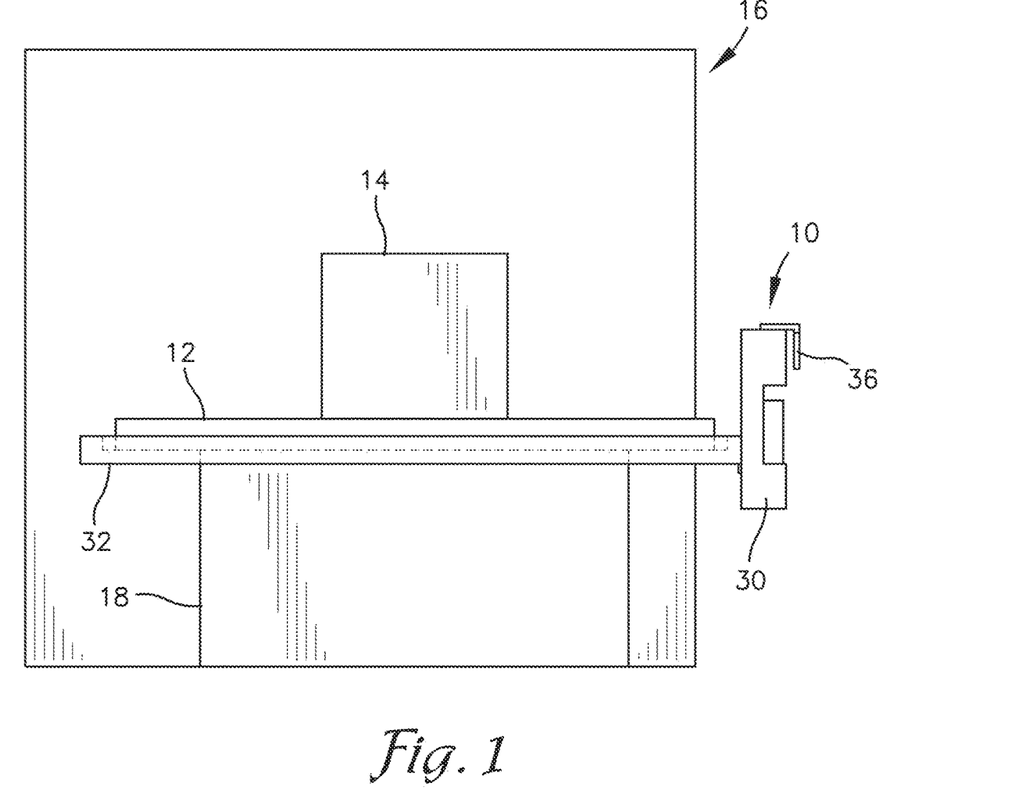
FIG. 1 is a schematic side view of an attachment fixture constructed in accordance with embodiments of the present invention and extending into an additive manufacturing machine to retrieve a build plate with an additive manufactured part thereon, with lifting arms of the attachment fixture positioned to engage with edges of the build plate.
Figure 2:
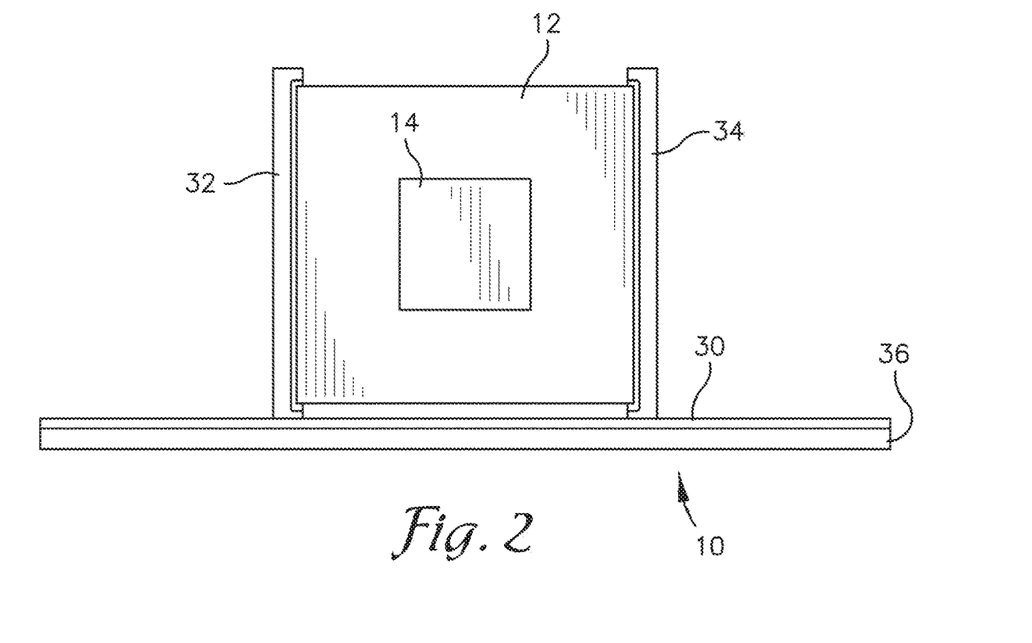
FIG. 2 is a schematic top view of the attachment fixture of FIG. 1 with the edges of the build plate resting in channels of the lifting arms.

Embodiments of the present invention, as illustrated in FIGS. 1-2, include an attachment device 10 for lifting and removing build plates 12 and additive manufactured parts 14 built on the build plates 12 out of an additive manufacturing machine 16. As illustrated in FIG. 1, the additive manufacturing machine may include structural supports 18 for holding and/or raising and lowering the build plate 12 and any devices known in the art for additive manufacturing a part on the build plate 12.

Figure 3:
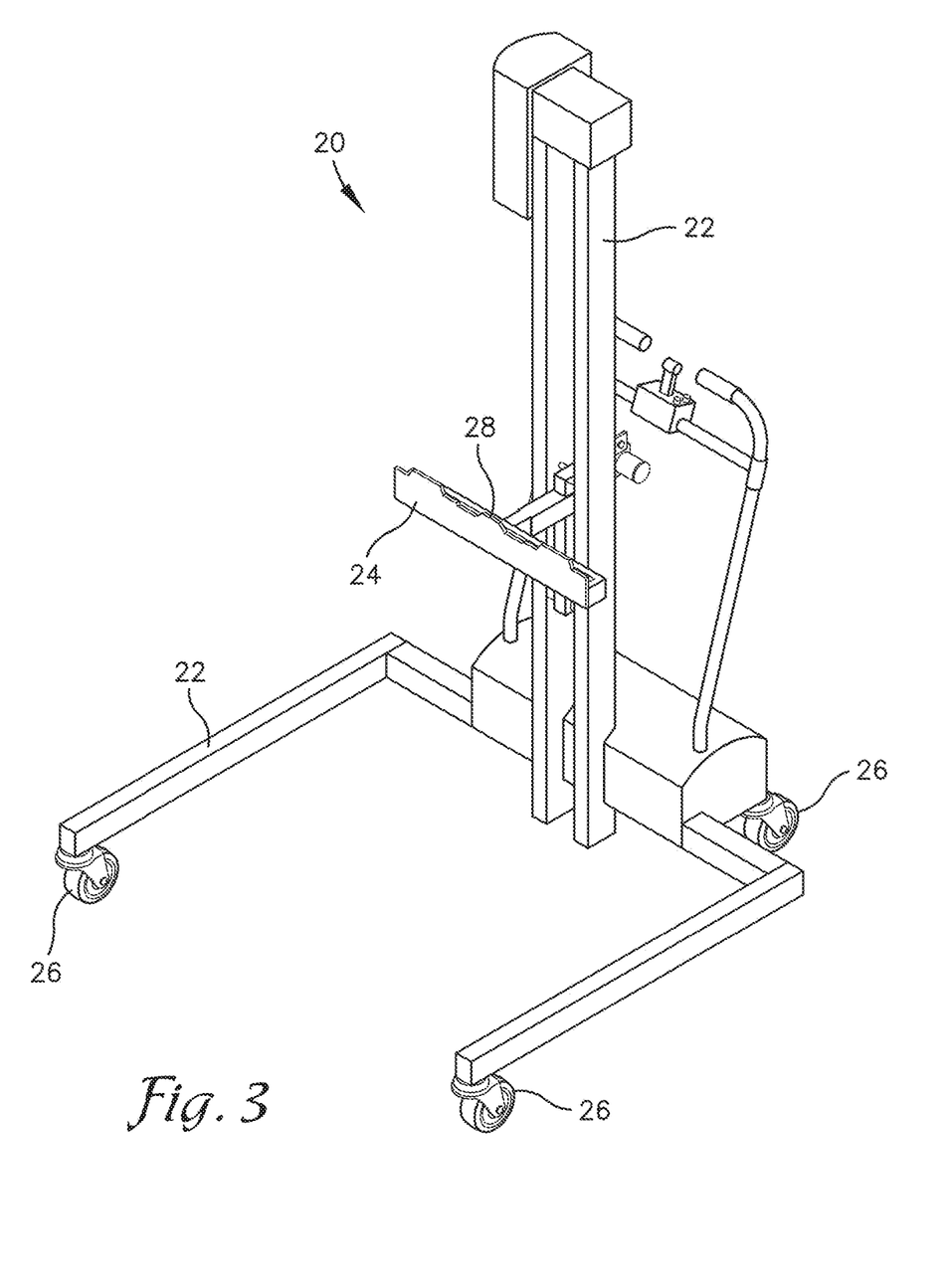
FIG. 3 is a perspective view of a lift trolley constructed in accordance with embodiments of the present invention.

The attachment device 10 may be sized and configured for attaching to a lift trolley 20, such as the Svenema Lift Trolley manufactured by Svenema Ergonomic Systems of Borås, Gotland, Sweden or the Renishaw silo lift manufactured by Renishaw plc of Wotton-under-Edge, Gloucestershire, United Kingdom. Other similar lifts may be used without departing from the scope of the invention. As illustrated in FIG. 3, the lift trolley may include a frame 22, a lifting device 24 configured to travel vertically up and down the frame 22, and wheels 26 rotatably attached to the frame 22. The lifting device 24 may travel relative to the frame 22 via any variety of actuators known in the art, particularly those for vertical travel on a lift trolley.

The lifting device 24 may include any connectors or attachments known in the art. For example, the lifting device 24 may be configured for attaching to a vertically-movable component of the frame 22 or may be permanently fixed to the vertically-movable component. The lifting device 24 may comprise forks 28 or various upward-protruding flanges configured for lifting and/or holding powder hoppers or powder boxes of the additive manufacturing machine 16. The wheels 26 may be configured for manually or automatically rolling the frame 22 on a surface such as a shop floor. However, other items for transporting the frame 22 relative to the shop floor or ground may be used without departing from the scope of the invention.

The attachment device 10 may include a support bar 30, two lifting arms 32,34, and a mounting bracket 36, each made of sufficiently rigid material, such as metal, composite materials, plastics, wood, or the like. The support bar 30 may have a slider track 38 formed into and/or through the support bar 30. Specifically, the slider track 38 may be an elongated opening in which the lifting arms 32,34 slide toward and away from each other, as later described herein. The slider track 38 may have a top edge 40 and a bottom edge 42 opposite the top edge 40. The slider track 38 may also have a plurality of indentions 44 or notches formed into the top edge 40 or the bottom edge 42 and spaced apart from each other, providing predetermined stopping points for the lifting arms 32,34, as later described herein. The spacing of the indentions 44 may correspond with a variety of standard build plate widths, as known in the art, thus placing the lifting arms 32,34 at a proper distance apart for lifting edges of the build plate 12, as later described herein. The support bar 30 may also have a front side 46 and an opposing back side 48, and may further include a recessed portion 50 on the back side 48 along a length of the slider track 38. This recessed portion 50 may slidably interface with a portion of the lifting arms 32,34, as later described herein.

The two lifting arms 32,34 may each be an elongated rectangular shape or any elongated shape. The two lifting arms 32,34 may include a left lifting arm 32 and a right lifting arm 34, each having a channel 52,54 formed along a length thereof. Specifically, the channels 52,54 may include a left channel 52 formed into the left lifting arm 32 and a right channel 54 formed into the right lifting arm 34. The channels 52,54 may each be comprised of two surfaces therein meeting at 90-degree angles with each other. Specifically, the channels 52,54 may be rectangular cuboids, right-angled channels, or L-shaped channels. These channels 52,54 may substantially face each other. For example, the channels 52,54 may include top openings and side openings, and the side opening of the right channel 54 may face the left channel 52 and the side opening of the left channel 52 may face the right channel 54. As can be seen in FIG. 2, this allows opposing edges of the build plate 12 to each simultaneously rest in one of the right channel 54 or the left channel 52.

Figure 5:
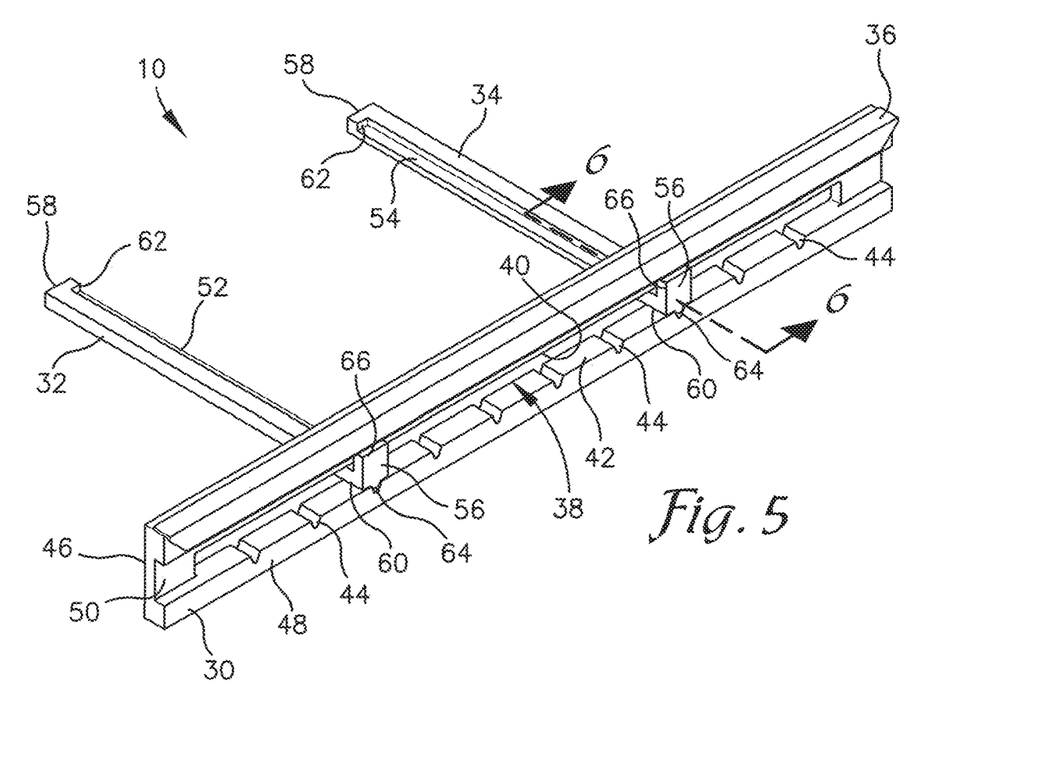
FIG. 5 is a top rear perspective view of the attachment fixture of FIG. 4.
Figure 7:
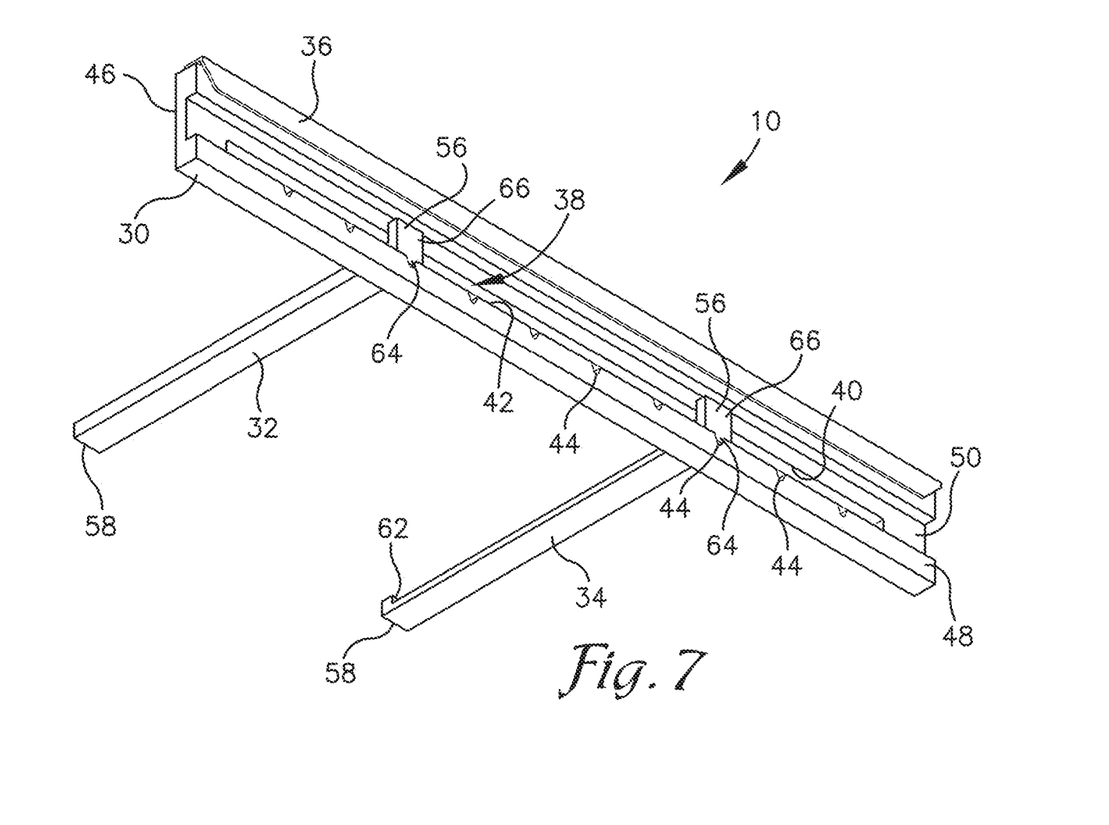
FIG. 7 is a bottom rear perspective view of the attachment fixture of FIG. 4.

The two lifting arms 32,34 may have a first end 56 and a second end 58 opposite the first end 56. The two lifting arms 32,34 may further include an interfacing portion 60 slidably located at least partially within the slider track 38 at or proximate the first end 56 and an end detent 62 or retention tab at or proximate to the second end. The interfacing portions 60 may each include at least one protrusion 64 shaped to be selectively seated into any one of the plurality of indentions 44. For example, the protrusions 64 may be substantially tapered and may mate with indentions that are substantially tapered, as illustrated in FIGS. 5 and 7. However other mating shapes of protrusions 64 and indentions 44 may be used without departing from the scope of the invention. In some embodiments of the invention, a height of the interfacing portions 60 may be smaller than a height of the slider track 38. Furthermore, a height of the interfacing portion 60 and the protrusions 64 extending downward therefrom may together be slightly less than the height of the slider track 38 at portions in between the indentions 44, thus allowing sliding between the lifting arms 32,34 and the slider track 38 when the protrusions 64 are not seated in one of the indentions 44 of the slider track 38.

Figure 4:
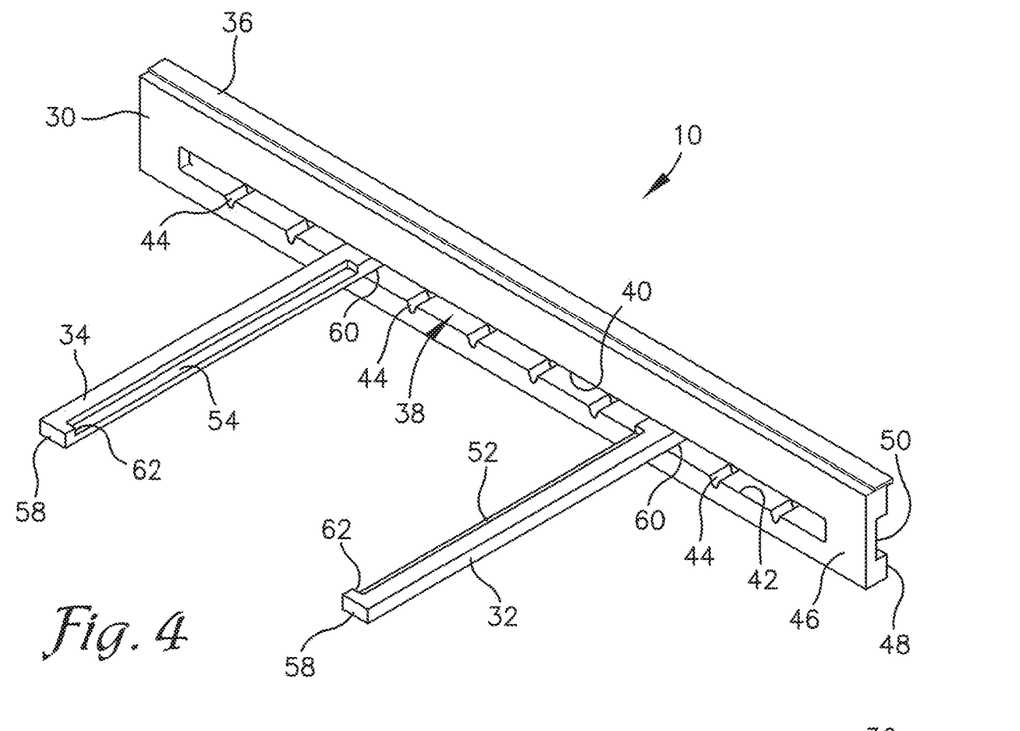
FIG. 4 is a top front perspective view of the attachment fixture of FIG. 1 configured for attaching to the lift trolley of FIG. 3.
Figure 6:
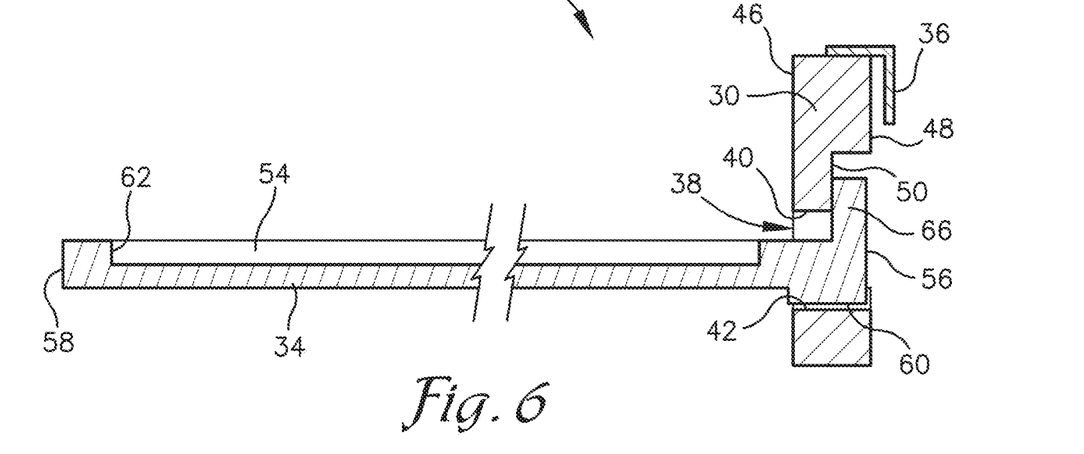
FIG. 6 is a cross-sectional view of the attachment fixture, taken along line 6-6 in FIG. 5.

The end detent 62 or retention tab at the second end 58 of the lifting arms 32,34 may be configured for preventing the build plate 12 cooperatively held by portions of the left channel 52 and the right channel 53 from sliding in a direction away from the support bar 30 and off of the left and right lifting arms 32,34. The end detents 62 may be integrally formed with the lifting arms 32,34 and/or otherwise attached at the second end 58 of the lifting arms 32,34. For example, the end detents 62 or retention tabs of the lifting arms 32,34 may merely be a portion of the lifting arms 32,34 not removed from a pathway of the channels 52,54 during formation thereof, as illustrated in FIGS. 4-6.

The two lifting arms 32,34 may each also have a retaining portion 66 at or proximate to the first end 56 of the lifting arms 32,34. The retaining portions 66 may be configured for retaining the interfacing portions 60 within the slider track 38 and preventing forward and/or aftward withdrawal of the lifting arms 32,34 out of the slider track 38 of the support bar 30. In some embodiments of the invention, the retaining portions 66 may include an upward-protruding portion and/or a downward-protruding portion at or aftward of the interfacing portions 60 of the lifting arms 32,34. These upward and/or downward-protruding portions may be taller than a maximum height of the slider track 38, thus preventing withdrawal of the lifting arms 32,34 through the slider track 38 or opening thereof. For example, as illustrated in FIG. 5, the lifting arms 32,34 include upward-protruding portions at the first end 56 of the lifting arms 32,34 that engage with the recessed portion 50 on the back side 48 of the support bar 30, preventing withdrawal of the lifting arms 32,34 forward in a direction away from the support bar 30.

Figure 8:
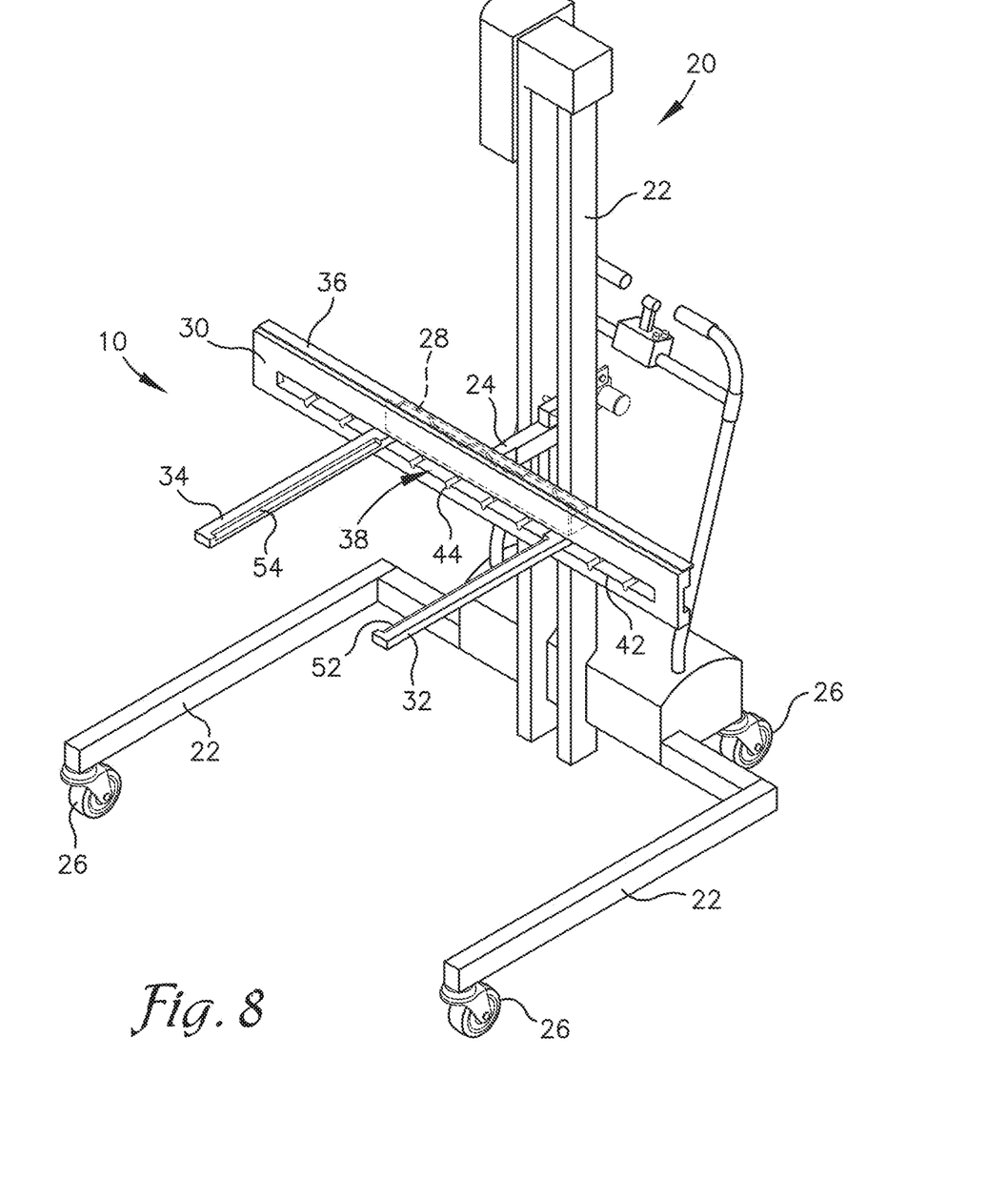
FIG. 8 is a perspective view of the lift trolley of FIG. 3 with the attachment fixture of FIG. 4 attached thereto.

The mounting bracket 36 may be configured to removably attach to the lifting device 24 of the lift trolley 20. As noted above, the lifting device 24 may include the fork 28, such as a fork typically configured to attach to and remove powder hoppers from the additive manufacturing machine 16. The mounting bracket 36 in some embodiments of the invention may be sized and shaped to slide over the fork 28 of the lifting device 24, as illustrated in FIG. 8. For example, the mounting bracket 36 may be an L-bracket, L-shaped bracket, U-bracket, or U-shaped bracket fixed to the support bar. The L-bracket or L-shaped bracket may be any bracket having two wall portions meeting together at a right angle. The U-bracket or U-shaped bracket may have two parallel portions spaced a distance apart by a perpendicular portion and/or a curved portion extending between the two parallel portions. However, the mounting bracket 36 may comprise additional or alternative brackets or attachment features for attaching the attachment device 10 to the lift trolley 20 without departing from the scope of the invention.

In use, the attachment device 10 may be attached to the lifting device 24 of the lift trolley 20, the lift trolley 20 may be moved or rolled up to the additive manufacturing machine 16 such that the lifting arms 32,34 reach therein, and the lifting device 24 may be actuated upward to engage the lifting arms 32,34 of the attachment device 10 with the build plate 12 in the additive manufacturing machine 16 and to continue to lift the build plate 12 upward and off of the additive manufacturing machine structural supports 18. The lifting arms 32,34 may also be slidably repositioned based on a size or width of the build plate 12 to be lifted thereon. Then, once the build plate 12 has been lifted off of the additive manufacturing machine structural supports 18, the frame 22 of the lift trolley 20 may be moved or rolled away from the additive manufacturing machine 16 and to a desired destination, without any lifting required by the operator.

Figure 9:
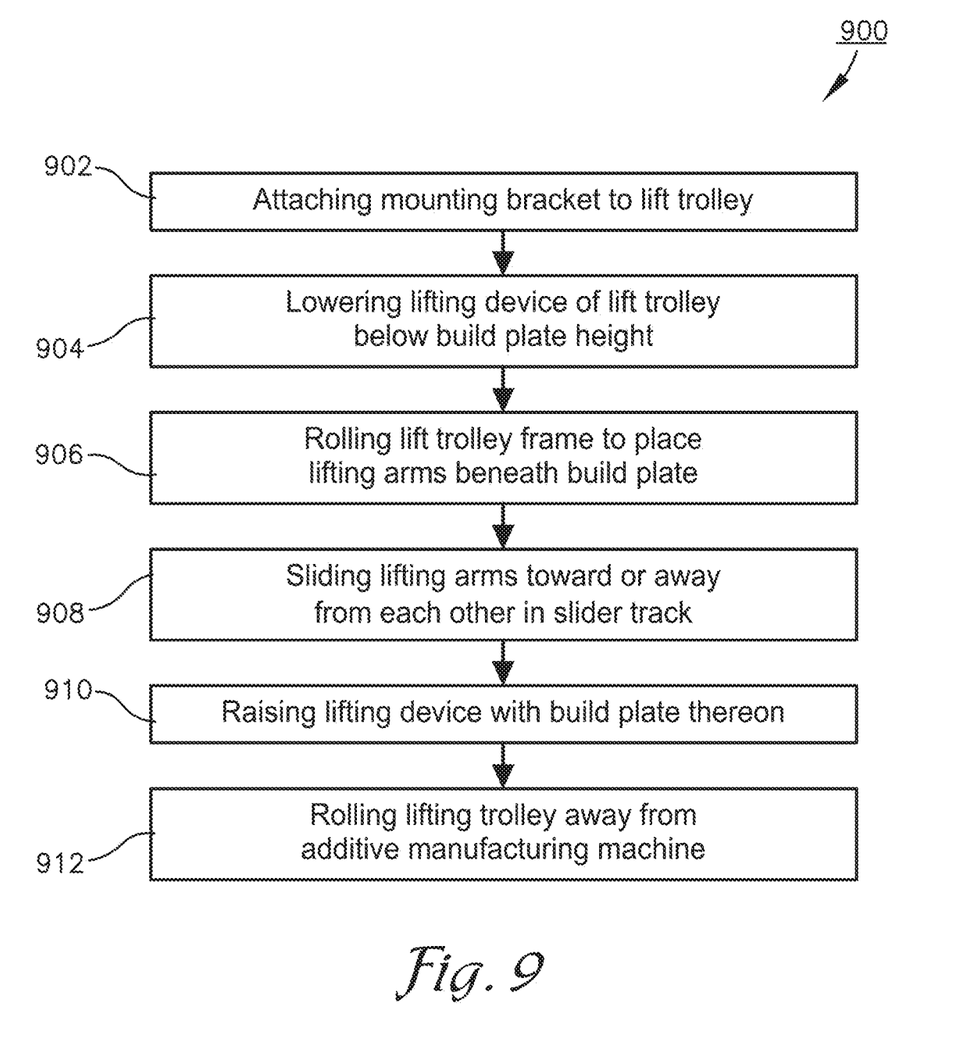
FIG. 9 is a flow chart of a method for retrieving a build plate and an additive manufactured part from an additive manufacturing machine in accordance with an embodiment of the present invention.

A flow chart of a method 900 for lifting and removing build plates 12 from additive manufacturing machines is illustrated in FIG. 9. In some alternative implementations, the functions noted in the various blocks may occur out of the order depicted. For example, two blocks shown in succession may in fact be executed substantially concurrently, or the blocks may sometimes be executed in reverse order depending upon the functionality involved.

The method 900, as illustrated in FIG. 9, may first include a step of attaching the mounting bracket 36 to the lifting device 24 of the lift trolley 20, as depicted in block 902. Specifically, the L-shaped bracket illustrated in FIG. 6 may slide onto the fork 28 of the lifting device 24. Other mechanical attachment components may additionally or alternatively be used without departing from the scope of the invention.

Next, depending on a current configuration of the lift trolley 20, the method may also include a step of lowering the lifting device 24 on the frame 22 of the lift trolley 20 to a height lower than the build plate 12 in the additive manufacturing machine 16, as depicted in block 904. Then, the method 900 may include a step of rolling or sliding the frame 22 of the lift trolley 20 in a direction toward the build plate 12, as depicted in block 906, until the two lifting arms 32,34 are reaching into the additive manufacturing machine 16 below the build plate 12.

Either before or after step 906, the method 900 may also include a step of sliding at least one of the lifting arms 32,34 toward or away from each other in the slider track 28, as depicted in block 908, such that edges of the build plate 12 will engage with or at least partially rest in the channels 52,54 of each of the lifting arms 32,34 once the lifting arms 32,34 are raised to substantially the same height as the build plate 12. In some embodiments of the invention, this step may more specifically include sliding at least one of the two lifting arms 32,34 until one of the protrusions 64 is selectively seated into one of the plurality of indentions 44. Seating the protrusions 64 into the indentions 44 of the slider track 38 may prevent, inhibit, or mechanically restrain sliding movement of the lifting arms 32,34 within the slider track 38 once a weight of the build plate 12 and the additive manufactured part 14 are applied to the lifting arms 32,34. A distance between the indentions 44 in which the protrusions 64 are selectively seated may be approximately equal to a width of the build plate 12 to be retrieved by the attachment device 10.

The method 900 may further include a step of raising the lifting device 24 vertically, as depicted in block 910, thus raising the build plate 12 and the additive manufactured part 14 thereon to a height greater than the original height at which the build plate 12 rested within the additive manufacturing machine 16. This may be accomplished via the actuators of the lift trolley 20, such that the lifting device 24 travels vertically relative to the frame 22 and causes the attachment device 10 to likewise travel vertically, thus raising the build plate 12 with the lifting arms 32,34. Note that in some embodiments of the invention, the lifting device 24 may raise the attachment device 10 approximately to a level of the build plate 12 prior to the step 908 of sliding the arms toward each other, thus engaging the build plate 12, then raising the lifting device 24 further after this engagement of the build plate via the channels 52,54 of the lifting arms 32,34. Other method steps herein may be performed in a different order than described herein without departing from the scope of the invention.

The method 900 may then include a step of rolling or sliding the frame 22 of the lift trolley 20 in a direction away from the additive manufacturing machine 16, as depicted in block 912, thus carrying the build plate 12 and the additive manufactured part 14 out of the additive manufacturing machine 16 and onward to a secondary desired location. This rolling or sliding movement of the frame 22 may be manually performed by an operator and/or performed by other actuators or devices. The end detents 62 or retention tabs described above may prevent the build plate 12 from sliding in a direction away from the support bar 30 and off of the lifting arms 32,34 during this step, as illustrated in FIGS. 1 and 2.

In some alternative embodiments of the invention, the attachment device 10 described herein could be used as an attachment to any other type or brand of lift trolley or may be detachably or fixably part of a stand-alone lifting device. Furthermore, in some alternative embodiments of the invention, the lifting arms 32,34 may be motorized or otherwise automated. In yet another alternative embodiment of the invention, a locking device may be used on or with the lifting arms 32,34 such that they do not inadvertently move out of position. In some embodiments of the invention, a splash tray may be mounted or otherwise fixed underneath the support bar 30 and/or the lifting arms 32,34 for catching loose powder that may fall off of the additive manufactured part 14 during removal.

Although the invention has been described with reference to the embodiments illustrated in the attached drawing figures, it is noted that equivalents may be employed and substitutions made herein without departing from the scope of the invention as recited herein.

Having thus described one or more embodiments of the invention, what is claimed as new and desired to be protected by Letters Patent includes the following:

1. A method of removing a build plate and an additive manufactured part built on the build plate out of an additive manufacturing machine, the method comprising the steps of:
    attaching a mounting bracket of an attachment device to a lifting device of a lift trolley;
    rolling or sliding a frame of the lift trolley in a direction toward the build plate until lifting arms of the attachment device are reaching into the additive manufacturing machine below the build plate;
    sliding the lifting arms toward or away from each other until edges of the build plate are vertically aligned with at least a portion of a channel of each of the lifting arms, each channel being formed along a length of one of the lifting arms;
    raising the lifting device vertically so that the lifting arms engage with and raise the build plate and the additive manufactured part upward and off of a surface of the additive manufacturing machine; and
    rolling or sliding the frame of the lift trolley in a direction away from the additive manufacturing machine so as to carry the build plate and the additive manufactured part out of the additive manufacturing machine.

2. The method of claim 1, further comprising the step of lowering the lifting device on the frame of the lift trolley to a height lower than the build plate in the additive manufacturing machine prior to the step of rolling or sliding the frame in the direction toward the build plate.

3. The method of claim 1, wherein the attachment device includes a support bar having a slider track extending into or through the support bar, each lifting arm including an interfacing portion slidably engaged with the slider track such that the lifting arms extend substantially forward from and perpendicular relative to the support bar.

4. The method of claim 3, wherein the slider track includes a plurality of indentions spaced apart from each other along a bottom portion of the slider track, wherein the interfacing portions of the lifting arms each include a protrusion extending downward in a direction toward the bottom portion of the slider track, the step of sliding the two lifting arms toward or away from each other including selectively seating each protrusions into one of the plurality of indentions.

5. The method of claim 1, wherein the lifting device is configured to travel vertically up and down the frame of the lift trolley via actuators of the lift trolley, the lift trolley including wheels configured for manual or automatic travel toward and away from the additive manufacturing machine.

6. The method of claim 1, wherein the channel in each of the lifting arms is an L-shaped channel, with the L-shaped channel of one of the lifting arms facing the L-shaped channel of another one of the lifting arms, wherein the lifting arms comprise end detents at ends of the channels, the end detents being configured for preventing the build plate from sliding in a direction away from the support bar and off of the lifting arms during the step of rolling or sliding the frame of the lift trolley in a direction away from the additive manufacturing machine.

7. A method of removing a build plate and an additive manufactured part built on the build plate out of an additive manufacturing machine, the method comprising the steps of:
    attaching a mounting bracket of an attachment device to a lifting device of a lift trolley;
    rolling or sliding a frame of the lift trolley in a direction toward the build plate until left and right lifting arms of the attachment device are reaching into the additive manufacturing machine below the build plate;

sliding the left and right lifting arms toward or away from each other until edges of the build plate are vertically aligned with at least a portion of a left channel of the left lifting arm and a right channel of the right lifting arm;

raising the lifting device vertically so that the lifting device engages with and raises the build plate and the additive manufactured part upward and off of a surface of the additive manufacturing machine; and rolling or sliding the frame of the lift trolley in a direction away from the additive manufacturing machine so as to carry the build plate and the additive manufactured part out of the additive manufacturing machine.

8. The method of claim 7, wherein the method includes performing the step of sliding the left and right lifting arms before the step of raising the lifting device vertically so that the lifting device engages the build plate primarily via top openings of the left and right lifting arms.

9. The method of claim 7, wherein the method includes performing the step of raising the lifting device vertically before the step of sliding the left and right lifting arms so that the lifting device engages the build plate primarily via side openings of the left and right lifting arms.

10. The method of claim 7, wherein the method includes simultaneously performing the step of raising the lifting device vertically and the step of sliding the left and right lifting arms so that the lifting device engages the build plate via top openings and side openings of the left and right lifting arms.

11. The method of claim 7, further comprising a step of lowering the lifting device on the frame of the lift trolley to a height lower than the build plate in the additive manufacturing machine prior to the step of rolling or sliding the frame in the direction toward the build plate.

12. The method of claim 7, wherein the lifting device is configured to travel vertically up and down the frame of the lift trolley via actuators of the lift trolley, the lift trolley including wheels configured for manual or automatic travel toward and away from the additive manufacturing machine.

13. The method of claim 7, wherein the attachment device includes a support bar having a slider track extending into or through the support bar, each lifting arm including an interfacing portion slidably engaged with the slider track such that the lifting arms extend substantially forward from and perpendicular relative to the support bar.

14. The method of claim 13, wherein the slider track includes a plurality of indentions spaced apart from each other along a bottom portion of the slider track, wherein the interfacing portions of the left and right lifting arms each include a protrusion extending downward in a direction toward the bottom portion of the slider track, the step of sliding the left and right lifting arms toward or away from each other including selectively seating each protrusion into one of the plurality of indentions.

15. The method of claim 7, wherein the lifting arms comprise end detents at ends of the left and right channels, the end detents being configured for preventing the build plate from sliding in a direction away from the support bar and off of the lifting arms during the step of rolling or sliding the frame of the lift trolley in a direction away from the additive manufacturing machine.

16. A method of removing a build plate and an additive manufactured part built on the build plate out of an additive manufacturing machine using an attachment device, the method comprising the steps of:

attaching a mounting bracket of an attachment device to a lifting device of a lift trolley;

rolling or sliding a frame of the lift trolley in a direction toward the build plate until left and right lifting arms of the attachment device are reaching into the additive manufacturing machine below the build plate;

moving protrusions of the left and right lifting arms out of first indentions of a slider track of a support bar of the attachment device;

sliding the left and right lifting arms toward or away from each other until edges of the build plate are vertically aligned with at least a portion of a left channel of the left lifting arm and at least a portion of a right channel of the right lifting arm;

inserting the protrusions of the left and right lifting arms into second indentations of the slider track different from the first indentations so as to laterally retain the left and right lifting arms;

raising the lifting device vertically so that the lifting device engages with and raises the build plate and the additive manufactured part upward and off of a surface of the additive manufacturing machine; and rolling or sliding the frame of the lift trolley in a direction away from the additive manufacturing machine so as to carry the build plate and the additive manufactured part out of the additive manufacturing machine.

17. The method of claim 16, wherein the step of moving the protrusions of the left and right lifting arms out of first indentations of the slider track includes lifting the left and right lifting arms relative to the slider track.

18. The method of claim 16, wherein the step of inserting the protrusions of the left and right lifting arms into second indentations of the slider track includes positioning the protrusions above the second indentations.

19. The method of claim 16, wherein the step of rolling or sliding a frame of the lift trolley in a direction toward the build plate until the left and right lifting arms are reaching into the additive manufacturing machine below the build plate includes positioning end detents of the left and right lifting arms beyond the build plate so that the end detents retain the build plate on the left and right lifting arms when the lifting device engages with and raises the build plate.

20. The method of claim 16, wherein the frame is U-shaped, the step of rolling or sliding the frame in a direction toward the build plate includes straddling the additive manufacturing machine via the frame.

* * * * *